(12) United States Patent
Kovacs et al.

(10) Patent No.: US 11,339,006 B2
(45) Date of Patent: May 24, 2022

(54) ALIGNMENT DEVICE FOR A CONVEYOR

(71) Applicant: Laitram, L.L.C., Harahan, LA (US)

(72) Inventors: Joseph F. Kovacs, New Orleans, LA (US); Matthew L. Fourney, Laurel, MD (US); Angela Longo Marshall, Harahan, LA (US); Benson Hall, River Ridge, LA (US); Mitchell G. Pansano, Jr., Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/256,358

(22) PCT Filed: Jul. 1, 2019

(86) PCT No.: PCT/US2019/040118
§ 371 (c)(1),
(2) Date: Dec. 28, 2020

(87) PCT Pub. No.: WO2020/014027
PCT Pub. Date: Jan. 16, 2020

(65) Prior Publication Data
US 2021/0114820 A1 Apr. 22, 2021

Related U.S. Application Data

(60) Provisional application No. 62/695,271, filed on Jul. 9, 2018.

(51) Int. Cl.
*B65G 47/30* (2006.01)
*B65G 15/42* (2006.01)
(Continued)

(52) U.S. Cl.
CPC ............. *B65G 47/30* (2013.01); *B65G 15/42* (2013.01); *B65G 17/24* (2013.01); *B65G 21/2054* (2013.01); *B07C 3/08* (2013.01)

(58) Field of Classification Search
CPC ........ B65G 47/30; B65G 15/42; B65G 17/24; B65G 21/2054; B65G 47/22; B65G 47/28; B07C 3/08
See application file for complete search history.

(56) References Cited

U.S. PATENT DOCUMENTS 4,664,248 A 5/1987 Goodman, Jr. et al.
5,170,879 A * 12/1992 Smith ................ B65G 21/2054
198/452

(Continued)

FOREIGN PATENT DOCUMENTS

CH 702755 A1 8/2011
CN 207046235 U 2/2018
(Continued)

OTHER PUBLICATIONS

"Installation at UPS—Oakland-North Bay Facility, California, USA, by Intralox, LLC, Oct. 16, 2014."
(Continued)

*Primary Examiner* — Mark A Deuble
(74) *Attorney, Agent, or Firm* — Catherine M. Bishop

(57) ABSTRACT

An article conveying system includes an alignment guide that allows larger packages to be spaced inwards from an aligning edge of a conveyor. The alignment guide provides at least two different registration points for packages, depending on the height of the packages. High profile packages, such as large boxes, are inset from an alignment edge of the conveyor, while low profile articles, such as envelopes, are registered against the alignment edge.

18 Claims, 7 Drawing Sheets

(51) Int. Cl.
*B65G 17/24* (2006.01)
*B65G 21/20* (2006.01)
*B07C 3/08* (2006.01)

(56) References Cited

U.S. PATENT DOCUMENTS

| | | | |
|---|---|---|---|
| 5,762,174 A | 6/1998 | Risley et al. | |
| 6,390,282 B1* | 5/2002 | Ouellette | B65G 15/14 |
| | | | 198/502.2 |
| 9,212,006 B1* | 12/2015 | Platiau | B65G 47/46 |
| 10,781,055 B1* | 9/2020 | Dwivedi | B07C 5/06 |
| 2007/0209909 A1* | 9/2007 | Fourney | B65G 17/24 |
| | | | 198/728 |
| 2009/0071801 A1* | 3/2009 | Wolf | B65G 47/22 |
| | | | 198/617 |
| 2012/0168279 A1 | 7/2012 | Baechle | |
| 2020/0290824 A1* | 9/2020 | Briddell | B65G 47/8815 |

FOREIGN PATENT DOCUMENTS

| | | | |
|---|---|---|---|
| FR | 2832654 A1 | 5/2003 | |
| JP | 06-278843 A | 10/1994 | |
| KR | 200345755 Y1 | 3/2004 | |

OTHER PUBLICATIONS

Extended European Search Report, European Patent Application No. 19834207.3, dated Mar. 9, 2022, European Patent Office, Munich Germany.

* cited by examiner

ALIGNMENT DEVICE FOR A CONVEYOR

RELATED APPLICATIONS

This application claims priority to U.S. Provisional Patent Application No. 62/695,271, filed Jul. 9, 2018, entitled "Alignment Device for a Conveyor", the contents of which are herein incorporated by reference.

FIELD OF THE INVENTION

The present invention relates to the field of power-driven conveyors. More particularly, the present invention relates to an alignment device for positioning articles on a conveyor.

BACKGROUND OF THE INVENTION

In mail processing systems and other applications involving processing of articles, it is often necessary to align articles on a conveyor belt before sorting or performing another process. Currently, means for aligning packages may sometimes result in packages or envelopes becoming trapped, damaged andor accidentally ejected from the system.

SUMMARY OF THE INVENTION

A conveyor system includes an alignment guide for locating product on a conveyor. The alignment guide provides at least two different registration points for packages, depending on the height of the packages. High profile packages, such as large boxes, are inset from an alignment edge of the conveyor, while low profile articles, such as envelopes, are registered against the alignment edge.

According to one aspect, a conveyor, comprises a first conveyor for conveying articles, the first conveyor having a conveying surface and an alignment edge and an alignment guide adjacent to the alignment edge. The alignment guide comprises a vertically-oriented belt having a base adjacent the alignment edge and an indenting portion extending inwards from the base to an inner edge and from a bottom edge to an upper edge to form a gap between the alignment edge, the bottom edge of the indenting portion and the conveying surface of the first conveyor.

According to another aspect, a conveyor comprises a first conveyor for conveying articles, the first conveyor having a conveying surface and an alignment edge, and an alignment guide adjacent to the alignment edge of the first conveyor. The alignment guide comprises a first vertical belt adjacent to and extending along the alignment edge and an inclined belt above the first vertical belt for indenting packages away from the alignment edge.

According to another aspect, a method of positioning articles on a conveyor comprises the steps of conveying articles using a first conveyor having a conveying surface and an alignment edge, pushing the articles towards the alignment edge, stopping an article having a height larger than a selected height using an indenting portion on an endless belt traveling adjacent to the alignment edge and passing an article having a height smaller than the selected height through a gap formed between the indenting portion, the conveying surface and a base of the endless belt.

DETAILED DESCRIPTION

A conveying system includes an alignment guide that locates product on a conveyor. The invention will be described below relative to certain illustrative embodiments, though those skilled in the art will recognize that the invention is not limited to the illustrative embodiments.

Figure 1:
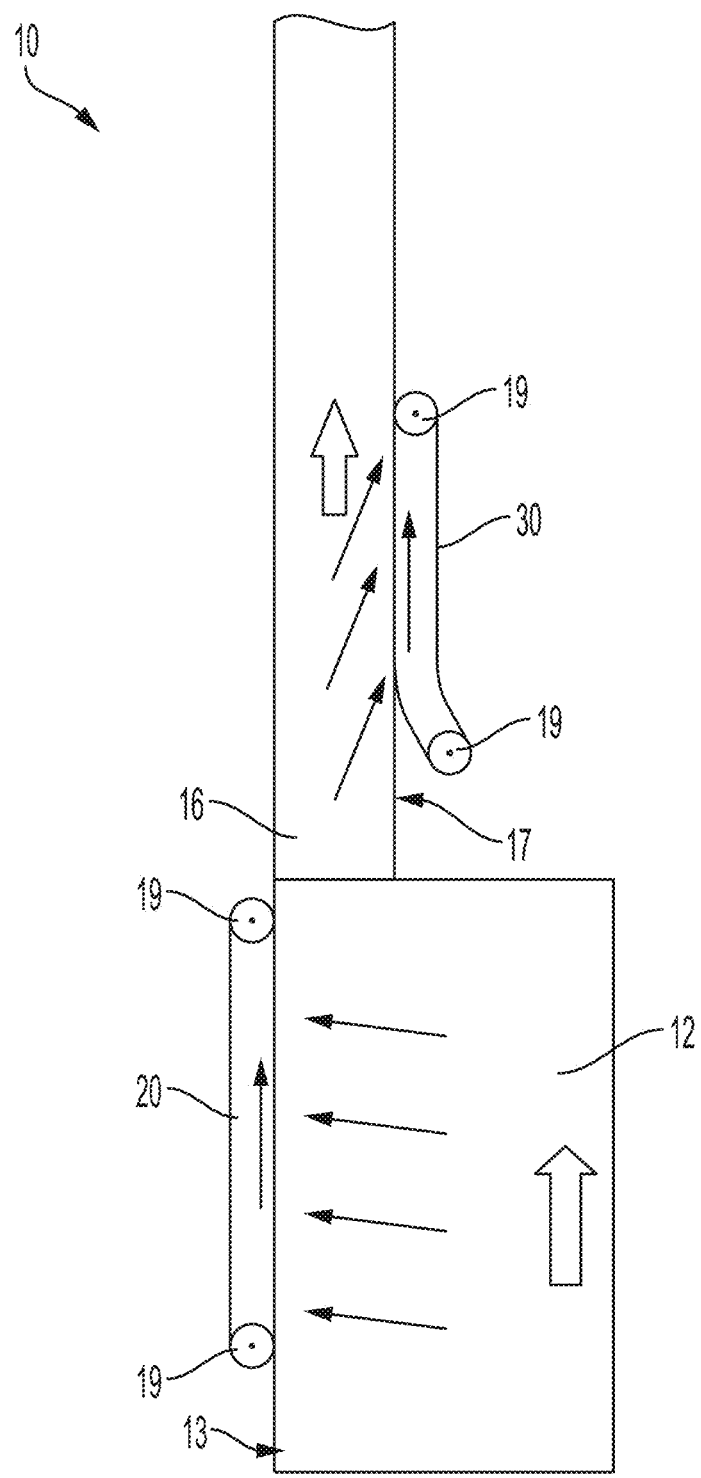
FIG. 1 is a top view of a conveying system including an alignment guide according to an embodiment of the invention.

FIG. 1 is an overhead schematic view of a conveying system 10 including an alignment guide according to an embodiment of the invention. The conveying system includes a first article-carrying conveyor, shown as a merge conveyor 12, having a first alignment guide 20 for locating product relative to a first aligning edge 13 of the merge conveyor 12. A second article-carrying conveyor 16 receives product from the first article-carrying conveyor 12 and locates the product relative to a second aligning edge 17 using a second alignment guide 30. The alignment guides 20, 30 may comprise moving side rails, formed by vertical or inclined timing belts or other suitable belts running on edge and trained around belt guides 19, that advance with the associated article-carrying conveyors 12 or 16 to register conveyed products against the alignment guide.

Figure 2:
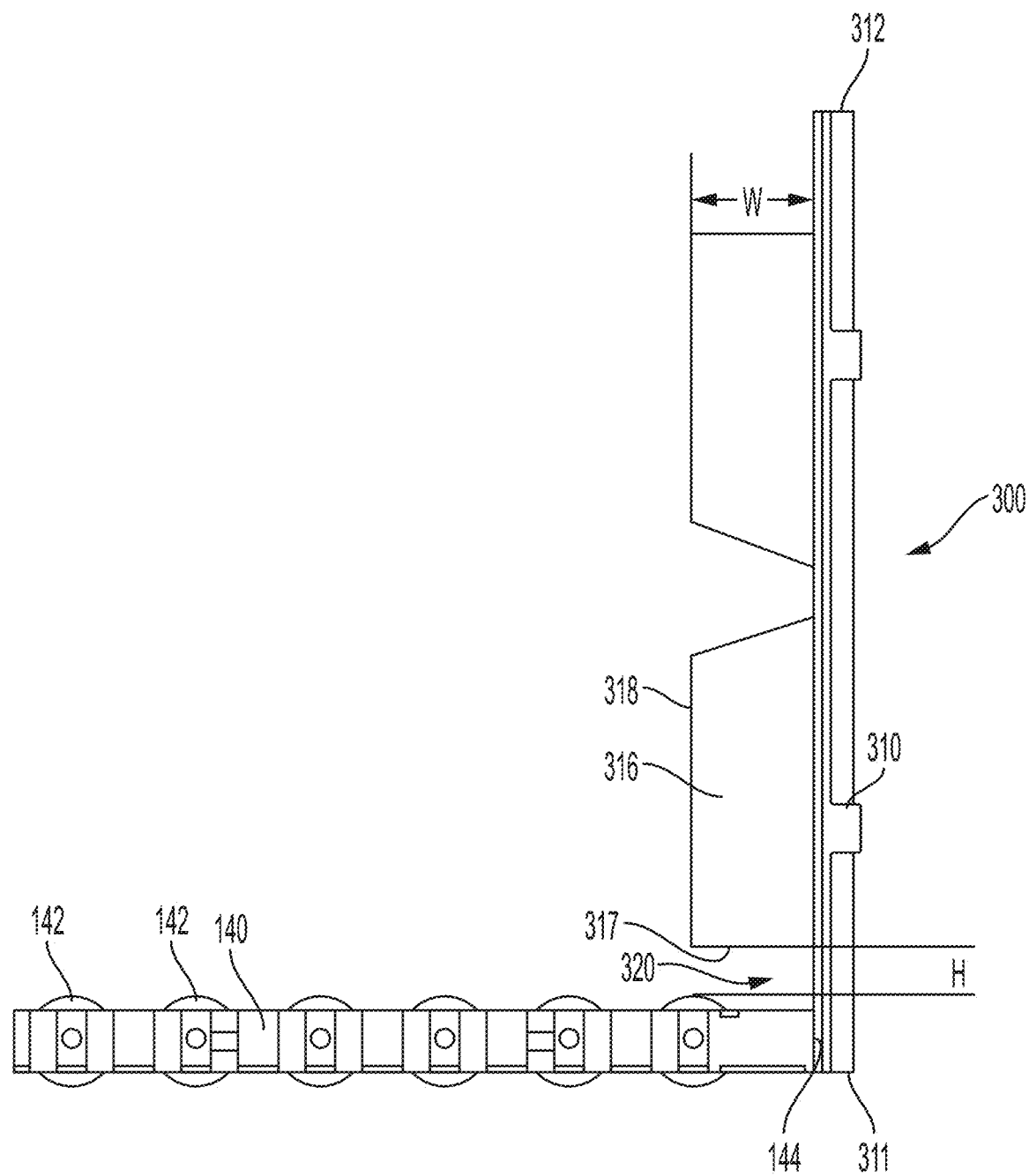
FIG. 2 is a front view of an alignment guide and conveyor belt according to an illustrative embodiment.

FIG. 2 is a front view of an alignment guide suitable for use in a conveying system. The alignment guide 300 can be used for packages to be sorted downstream and allows larger packages to be inset from envelopes or other low-profile packages. The alignment guide comprises a vertically-oriented endless belt 310 having a first span that can move alongside and with an article-conveying horizontal belt 140. The article-conveying horizontal belt 140 pushes conveyed articles towards the alignment guide 300 using rollers 142 or other suitable article-pushing means. The particular construction of the article-conveying horizontal belt 140 is relatively unimportant. The alignment guide 300 comprises the first span of the vertically-oriented endless belt 310 running along an aligning edge 144 of the article-conveying belt 140 for a certain length. The endless belt 310 is trained around belt guides and returns along a returnway spaced from the article-conveying belt 140. The vertically-disposed endless belt 310 extends from a bottom edge 311 to a top edge 312 and further includes an indenting portion 316 that extends inwards for indenting certain packages from the aligning edge 144 of the article-conveying belt 140. The indenting portion 316 extends inwards from the vertically-disposed belt body to an inner edge 318 by an indenting width of W, which may be between about one-half an inch and about two inches, but depends on the particular application. In one embodiment, the inner edge 318 of the indenting portion 316 aligns with the peak of the roller 142 closest to the aligning edge 144, but the invention is not so limited. The bottom edge 317 of the indenting portion 316 is spaced the top of the roller 142 or other article-carrying surface of the article-conveying belt 140 by a height H of between about ½ inch and about 3 inches, though the invention is not so limited and depends on the particular application. The indenting portion 316 thus forms a gap 320 having a selected height H and width W. The top edge of the indenting portion 316 can be any suitable location and have any suitable configuration. The indenting portion can be continuous from the bottom edge 317 to the top edge of the indenting portion, or it may have one or more intermediate gaps, as shown.

The vertically-oriented endless belt 310 can move at the same speed as the horizontal belt 140, or at a different speed, and the speed can be adjusted based on various parameters. In one embodiment, the vertically-disposed endless belt 310 can comprise two or more vertically-oriented belts arranged in series to increase the height of the alignment guide 300. The vertically-oriented endless belt 310 can be driven by a sprocket, pulley or other suitable means, with a returnway of the belt passing to the side of the vertical carryway portion adjacent the article-conveying belt.

Figure 3:
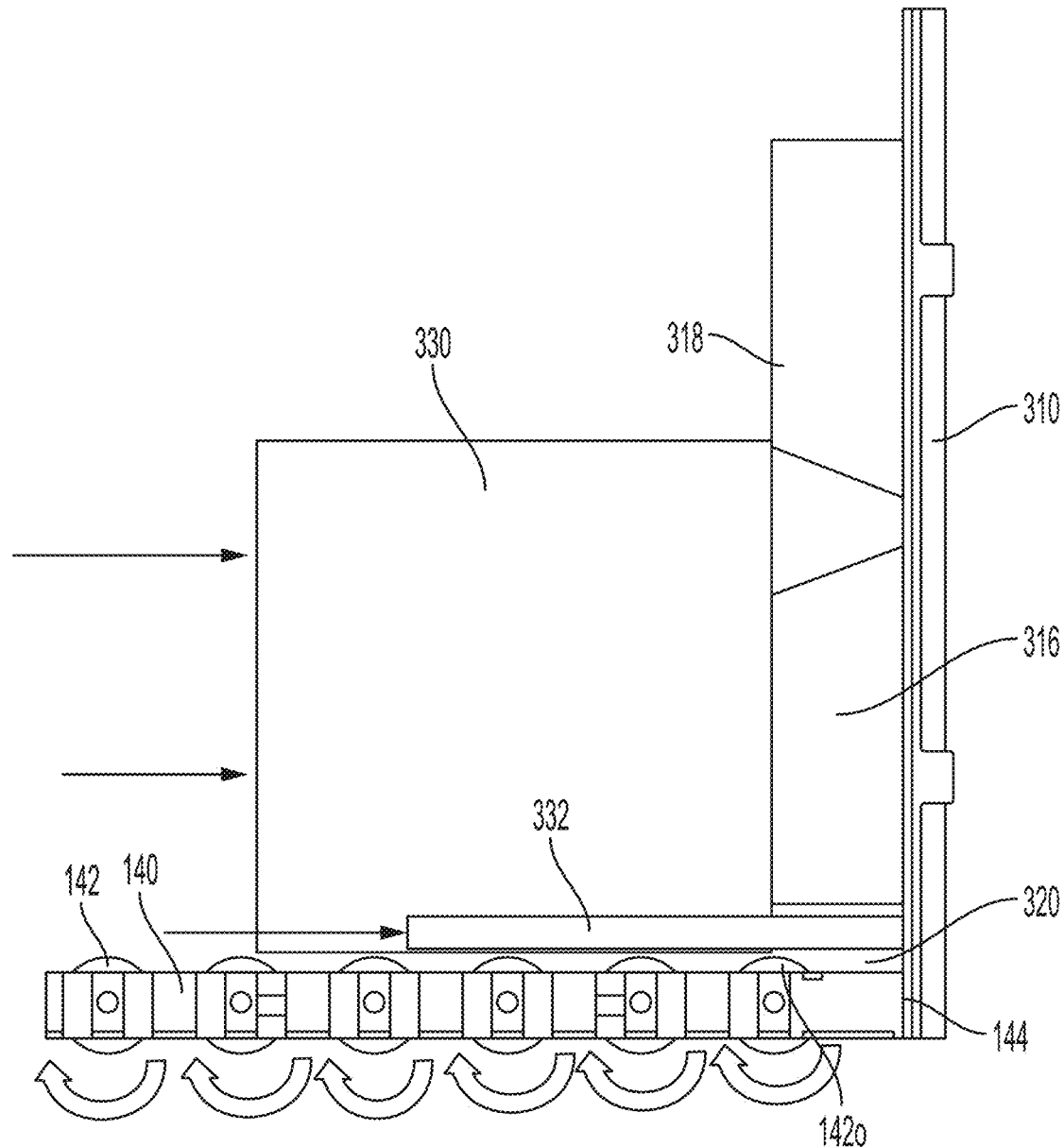
FIG. 3 shows the alignment guide and conveyor belt of FIG. 2 with packages registered in two positions during operation.

As shown in FIG. 3, during operation, the horizontal article-carrying conveyor belt 140 pushes conveyed articles 330, 332 towards the alignment edge 144, either by activating the rollers 142 or through another suitable means. Articles with a low profile (below the height H of the gap 320), such as envelope 332, will be pushed through the gap 320 all the way to the base of the endless belt 310, in alignment with the alignment edge 144. Articles taller than the gap 320, such as box 330, will be pushed against the inner edge 318 of the indenting portion 316 and thus inset from the alignment edge 144 by a distance equal to the width W of the gap 320. All larger packages will thus be registered against the indenting portion 316 while smaller packages will be registered against the alignment edge 144 or other selected location.

The alignment of larger packages away from the alignment edge 144 reduces the risk of unstable packages falling off the conveyor. The outermost roller 142o closest to the aligning edge 144 supports the edge of the large package 330.

The illustrative endless belt 310 is a flat belt with a coating or other attachment forming the indenting portion 316 for creating the gap 320. An example of a suitable belt is an endless, self-tracking belt with a foam-based coating available from BRECOflex CO., L.L.C. of Eatontown, N.J. The foam-based coating, which may be up to about an inch thick, provides a soft, high friction surface, cushions potentially fragile packages from damage and dampens the impact of a package hitting the alignment guide, while facilitating the positioning of the package on the conveyor 140. In another embodiment, the indenting portion 316 comprises a rubber coating extending from a base conveyor belt. An example of a suitable rubber coating is the Linatex® product available from The Weir Group and other coatings known in the art. The vertically-disposed endless belt 310 can comprise any suitable type of endless belt, including, but not limited to, a timing belt, a friction-driven flat belt, a modular endless belt, and other endless belts known in the art.

The illustrative coating forming the indenting portion 316 extends about one inch from the base of the belt, so that the inner edge 318 of the indenting portion aligns with the top of the roller 142 closest to the aligning edge 144, though the invention is not so limited.

Figure 4:
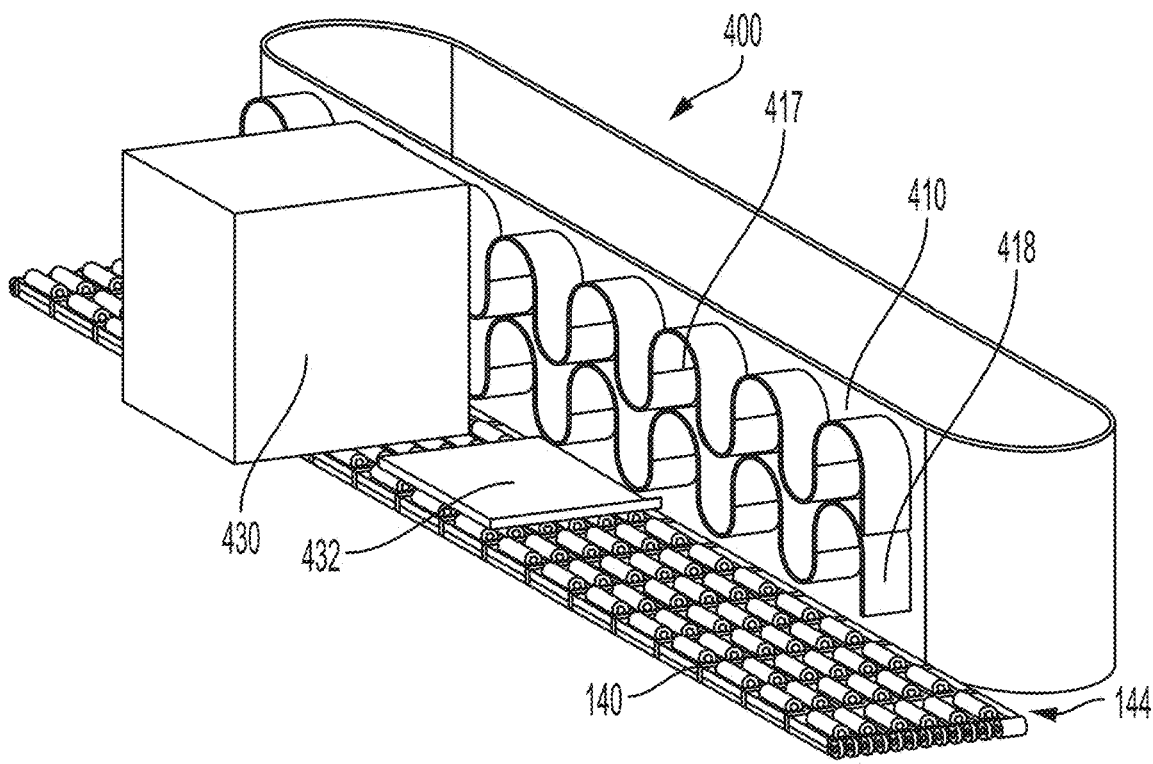
FIG. 4 is an isometric view of an alignment guide and conveyor belt according to another embodiment of the invention.
Figure 5:
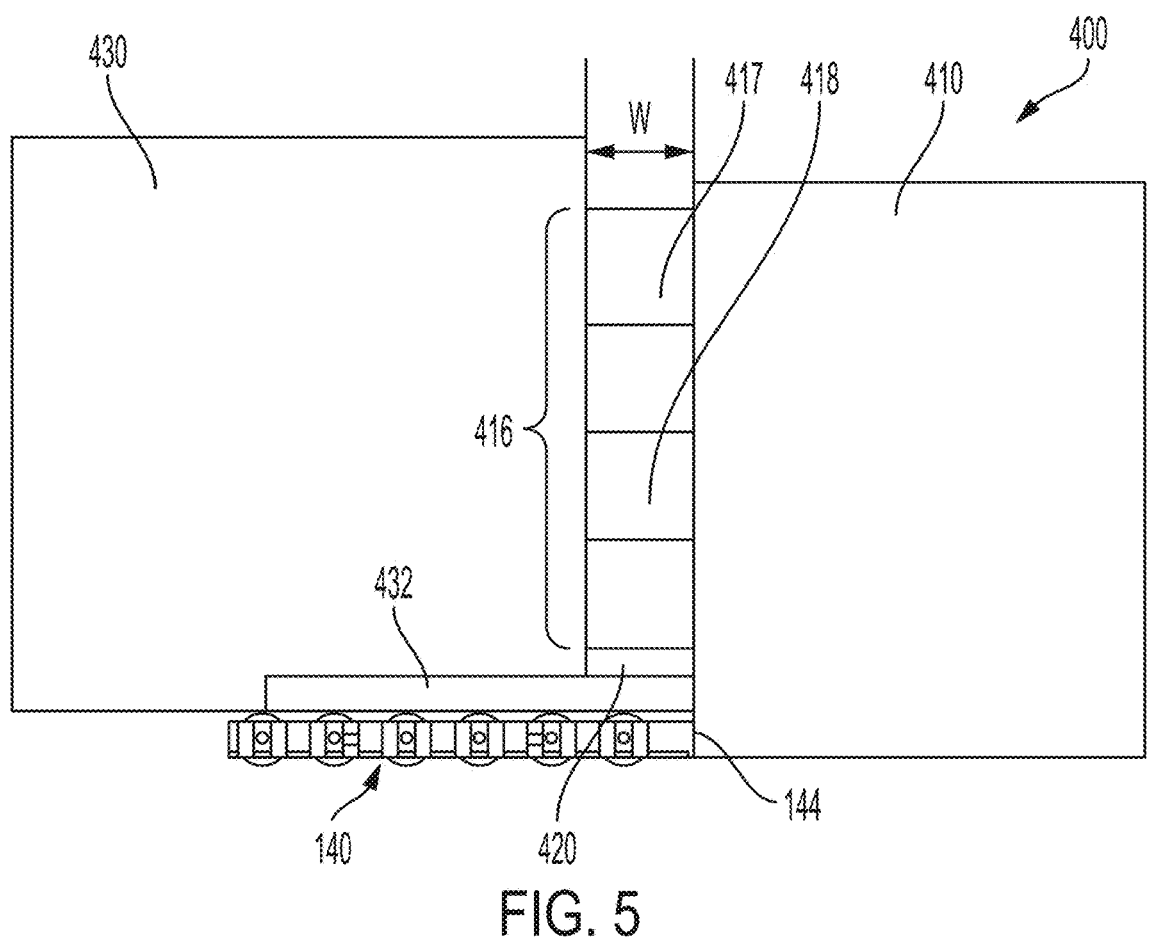
FIG. 5 is a front view of the alignment guide and conveyor belt of FIG. 4.

FIGS. 4 and 5 show another embodiment of an alignment guide 400 providing at least two registration points for packages. The alignment guide 400 comprises a base endless 410 oriented in a vertical position, or substantially vertical position, and extending along at least a portion of an alignment edge 144 of an article-conveying belt 140. An indenting portion 416 for indenting larger articles, such as box 430, comprises a pair of corrugated walls 417, 418 extending inwards from the base of the endless belt 410 by a selected distance W. The bottom of the lower corrugated wall 418 is spaced from the conveying surface (formed by the tops of rollers 142) of the article-conveying belt by a selected distance to form a gap 420. A benefit of the use of flexible corrugated walls is the lack of pinch points for conveyed products. Additional protrusions or blocks may be added to spaces within or between the curves of the walls 417, 418 to strengthen the indenting portion 416.

Articles with a low profile (below the height H of the gap 420), such as envelope 432, will be pushed through the gap 420 all the way to the base of the vertically-oriented belt 410, in alignment with the alignment edge 144. Articles taller than the gap 420, such as box 430, will be pushed against the inner edges of the corrugated walls 417, 418 and thus spaced inwards from the alignment edge 144 by a distance equal to the width W of the gap 420. The corrugated walls 417, 418 provide cushioning while helping to position larger packages 430 by a selected distance W away from the alignment edge 144, without potential pinch points.

Figure 6:
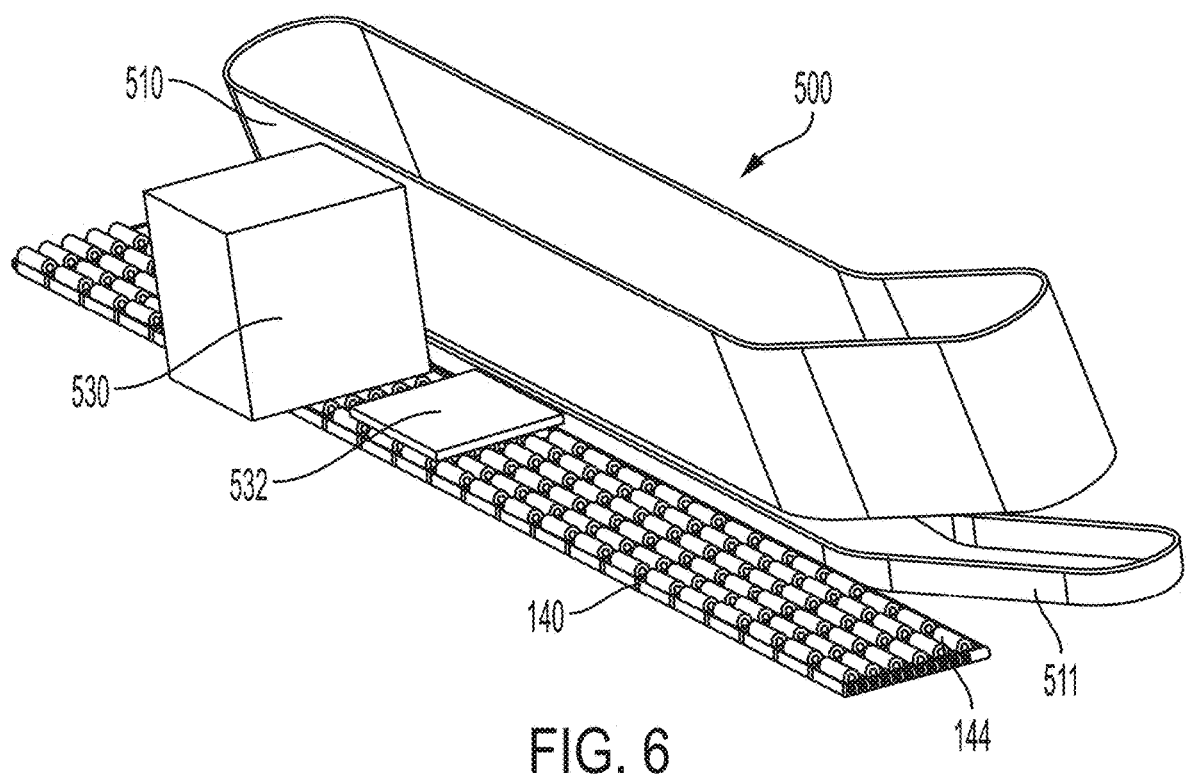
FIG. 6 is an isometric view of an alignment guide and conveyor belt according to another embodiment of the invention.
Figure 7:
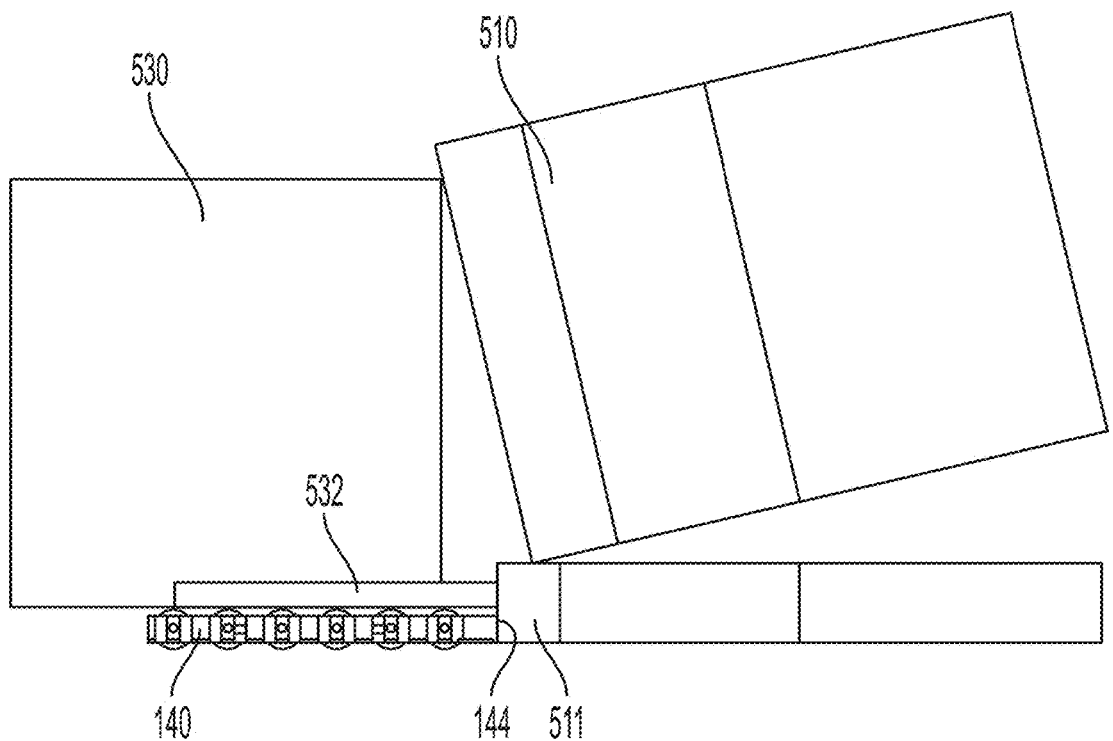
FIG. 7 is a front view of the alignment guide and conveyor belt of FIG. 6.

FIGS. 6 and 7 show another embodiment of an alignment guide 500 providing multiple registration points for conveyed packages. The alignment guide 500 comprises an angled conveyor belt 510 extending along an article-conveying belt 140 and tilted inwards at a slight angle. The illustrative conveyor belt 510 is angled between about 5° and about 25°, and preferably between about 10° and about 15° but the invention is not so limited. In one embodiment, the alignment guide 500 includes a vertically-oriented lower aligning belt 511 extending along the aligning edge 144 of the article conveyor belt 140. The vertically-oriented lower aligning belt 511 aligns lower-profile packages 532 against the aligning edge 144. The lower aligning belt 511 can have any suitable configuration and dimensions. In one embodiment, the lower aligning belt extends between about 0.5 and 2 inches above the top surface of the article-conveying belt, but the invention is not so limited. Larger packages 530 sit further from the aligning edge 144, as shown in FIG. 7. The indent of the larger packages depends on the height of the package 530 and the angle of the upper conveyor belt 510.

Figure 8:
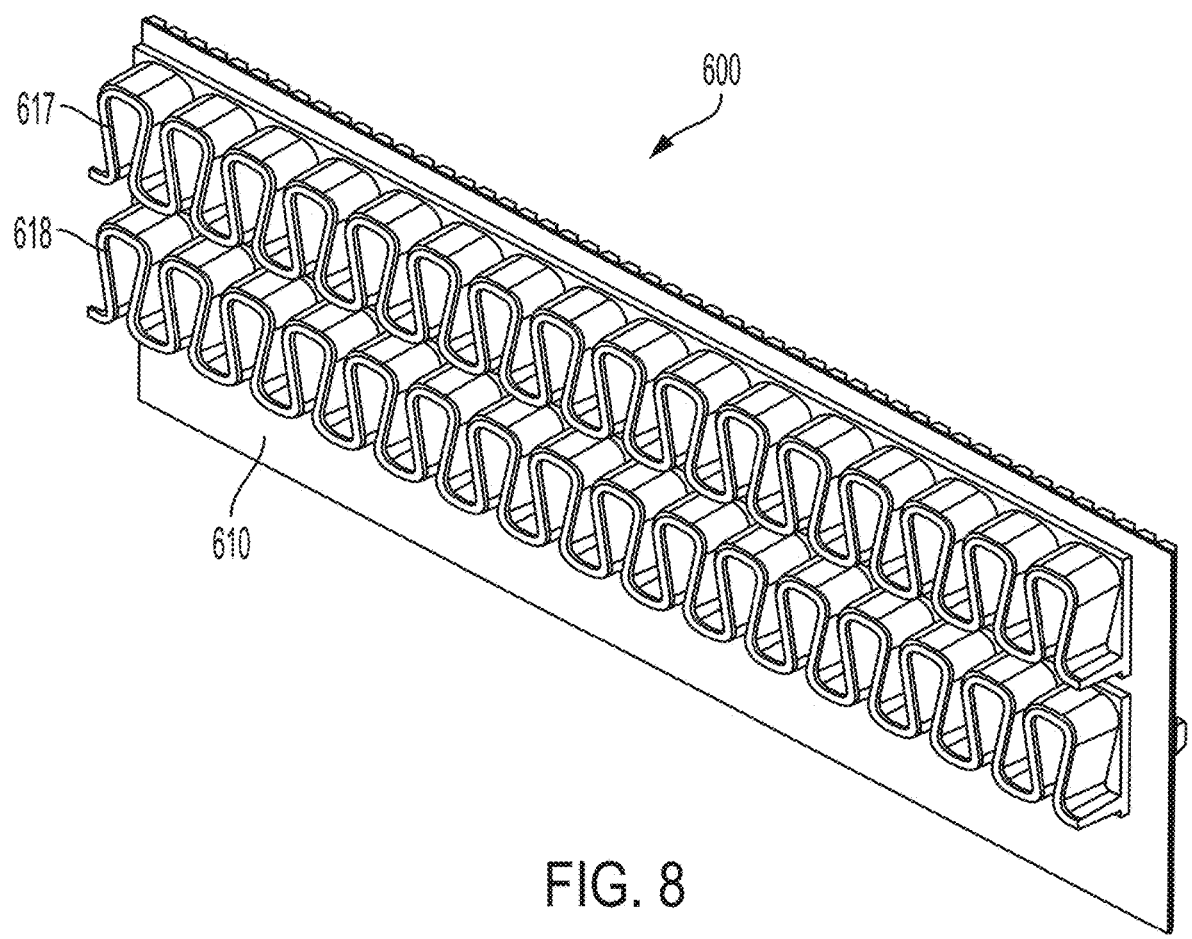
FIG. 8 is an isometric view of a portion of an alignment guide according to another embodiment.

FIG. 8 shows another embodiment of an alignment guide 600 suitable for providing multiple registration points for conveyed products. The alignment guide 600 comprises a base endless belt 610, which may be oriented vertically, or substantially vertically, next to an edge of an article-conveying belt, such as the article-conveying belt 140 described above. The illustrative alignment guide 600 further includes a pair of attachments 617, 618, each including a corrugated wall to form an indenting portion for positioning object having a height above the bottom of the indenting portion away from the edge of the article-conveying belt. The alignment guide 600 may have any suitable number of corrugated walls in any size or position, separated by any suitable separation distance. Each corrugated wall extends from a flat support portion that is attached to the surface of the endless belt 610 through any suitable means, such as glue, welding and other means known in the art. The illustrative corrugated walls include flat, wide peaks with angled sides so that the waves appear pinched, but the invention is not so limited. The bottom attachment 618 is spaced from the bottom of the endless belt 610 to form a gap for low-profile products, so that they can be registered against the surface of the endless belt 610 with higher-profile products registered against the attachments 617, 618.

Figure 9:
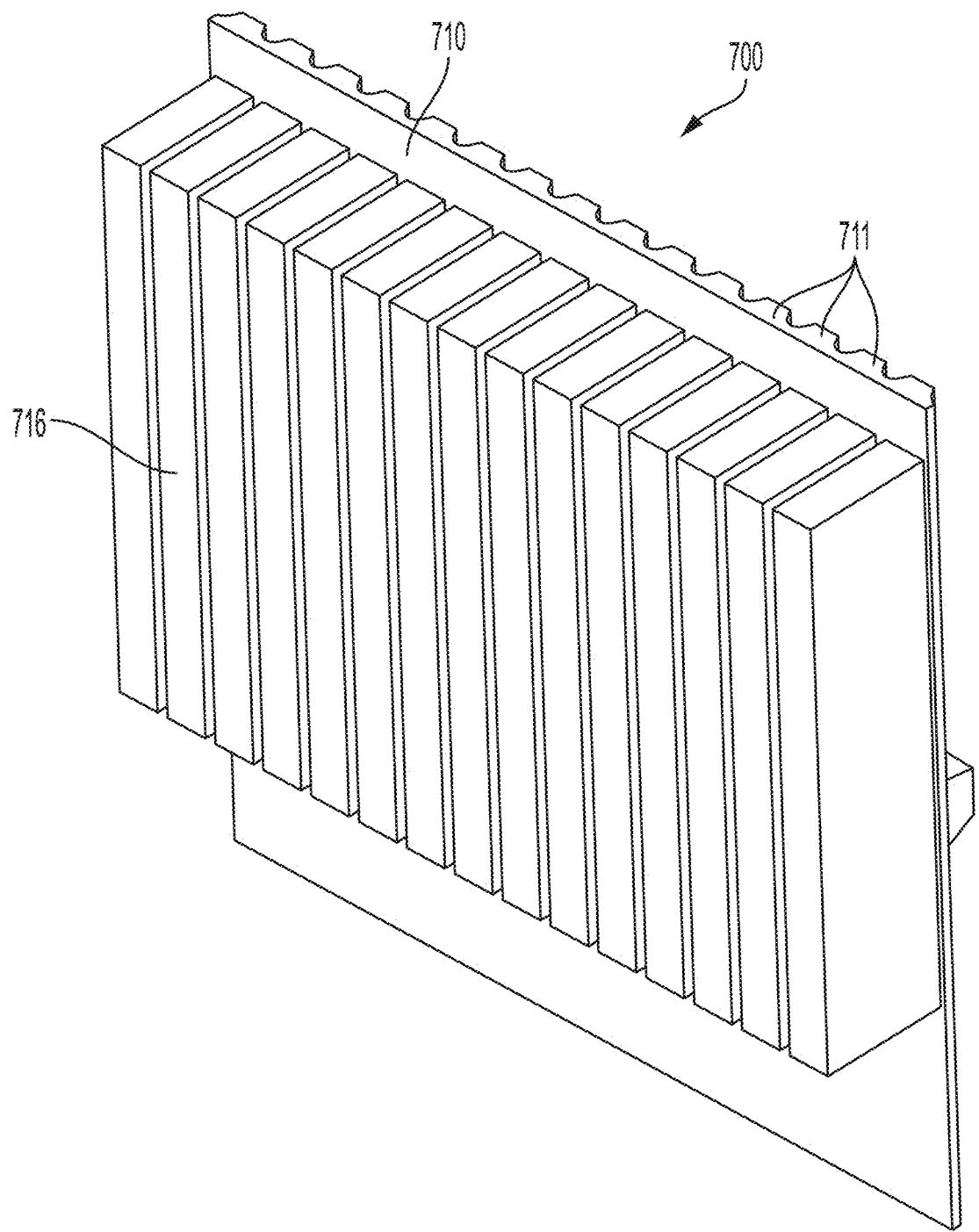
FIG. 9 is an isometric view of a portion of an alignment guide according to another embodiment.

FIG. 9 shows another embodiment of an alignment guide 700 suitable for providing multiple registration points for conveyed products. The alignment guide comprises a base endless belt 710 that runs vertically or substantially vertically adjacent to an edge of a product-conveying belt, such as such as the article-conveying belt 140 described above. An indenting portion comprises a series of closely-spaced solid blocks 716 attached to the surface of the endless belt 710 to create a nearly continuous indented surface still capable of navigating a sprocket or other reversing element. The illustrative blocks are urethane or another suitable material. In the illustrative embodiment, the base endless belt 710 is a timing belt having drive teeth 711 having a drive pitch of 10 millimeters. The illustrative alignment guides 700 includes a solid block 716 for each drive tooth 711. Each illustrative block 716 is about 8 millimeters thick, about 24 millimeters tall (to provide a 24-millimeter indent for larger packages from the edge of an article-conveying belt) and about 100 millimeters tall, resulting in about a 2-millimeter separation distance between each block, but the invention is not so limited.

The invention has been described relative to certain illustrative embodiments, though those skilled in the art will recognize that modifications may be made without departing from the scope of the invention.

What is claimed is:

1. A conveyor, comprising:
 a first conveyor for conveying articles, the first conveyor having a conveying surface and an alignment edge; and
 an alignment guide adjacent to the alignment edge, the alignment guide comprising a vertically-oriented belt having a base adjacent the alignment edge and an indenting portion extending inwards from the base to an inner edge and from a bottom edge to an upper edge to form a gap between the alignment edge, the bottom edge of the indenting portion and the conveying surface of the first conveyor, wherein the indenting portion comprises a plurality of corrugated walls extending from the base of the vertically-oriented belt.

2. The conveyor of claim 1, wherein each corrugated wall is attached to the base by a flat support portion attached to the base of the vertically-oriented belt.

3. The conveyor of claim 1, wherein each corrugated wall comprises a flat peak and angled sides.

4. The conveyor of claim 1, wherein the first conveyor includes a plurality of rollers for pushing packages towards the alignment guide.

5. The conveyor of claim 4, wherein the inner edge of the indenting portion aligns with a top of a roller closest to the alignment edge.

6. A conveyor, comprising:
 a first conveyor for conveying articles, the first conveyor having a conveying surface and an alignment edge; and
 an alignment guide adjacent to the alignment edge of the first conveyor, the alignment guide comprising a first vertical belt adjacent to and extending along the alignment edge and an inclined belt above the first vertical belt for indenting packages away from the alignment edge.

7. The conveyor of claim 6, wherein the first conveyor includes a plurality of rollers for pushing packages towards the alignment guide.

8. A conveyor, comprising:
 a first conveyor for conveying articles, the first conveyor having a conveying surface and an alignment edge; and
 an alignment guide adjacent to the alignment edge, the alignment guide comprising a vertically-oriented belt having a base adjacent the alignment edge and an indenting portion extending inwards from the base to an inner edge and from a bottom edge to an upper edge to form a gap between the alignment edge, the bottom edge of the indenting portion and the conveying surface of the first conveyor, wherein the indenting portion comprises a series of closely-spaced solid flights attached to the base of the vertically-oriented belt.

9. The conveyor of claim 8, wherein the first conveyor includes a plurality of rollers for pushing packages towards the alignment guide.

10. The conveyor of claim 9, wherein the inner edge of the indenting portion aligns with a top of a roller closest to the alignment edge.

11. The conveyor of claim 8, wherein the vertically-oriented belt base comprises a timing belt having drive teeth separated by a drive pitch.

12. The conveyor of claim 11, wherein the alignment guide includes a flight for each drive tooth.

13. The conveyor of claim 12, wherein each flight is about 8 millimeters thick to provide a 2-millimeter separation distance between each flight.

14. The conveyor of claim 12, wherein each flight is about 24 millimeters tall.

15. A conveyor, comprising:
 a first conveyor for conveying articles, the first conveyor having a conveying surface and an alignment edge, wherein the conveying surface is formed by a plurality of rollers for pushing packages towards the alignment edge; and
 an alignment guide adjacent to the alignment edge, the alignment guide comprising a vertically-oriented belt having a flat base adjacent the alignment edge and an indenting portion extending inwards by an indenting width from the base to an inner edge and from a bottom edge to an upper edge to form a gap between the alignment edge, the bottom edge of the indenting portion and the conveying surface of the first conveyor, wherein the inner edge of the indenting portion aligns with a top of a roller closest to the alignment edge.

16. The conveyor of claim 15, wherein the indenting width is between about one-half an inch and about two inches.

17. The conveyor of claim 15, wherein the bottom edge of the indenting portion is spaced from the top of the roller closest to the alignment edge by a height of between about ½ inch and about 3 inches.

18. The conveyor of claim 15, wherein the indenting portion is formed by a foam-based or rubber coating.

* * * * *